United States Patent [19]

Schor

[11] Patent Number: 4,882,691

[45] Date of Patent: Nov. 21, 1989

[54] CACHING ARGUMENT VALUES IN PATTERN-MATCHING NETWORKS

[75] Inventor: Marshall I. Schor, Katonah, N.Y.

[73] Assignee: International Business Machines Corporation, Armonk, N.Y.

[21] Appl. No.: 241,498

[22] Filed: Sep. 7, 1988

[51] Int. Cl.⁴ .............................................. G06F 15/18
[52] U.S. Cl. .................................... 364/513; 364/200; 364/276.6
[58] Field of Search ................ 364/513, 300, 200, 900

[56] References Cited

U.S. PATENT DOCUMENTS 4,837,735 6/1989 Allen, Jr. et al. .................... 364/513

OTHER PUBLICATIONS

Forgy "RETE: A Fast Algorithm for the Many Pattern/Many Object Pattern Match Problem"; Artificial Intelligence, vol. 19 pp. 17-37, North Holland 1982.

rownstone, Efficiency in OPS5 pp. 228-239, Addison-Wesley 1985.

Schor et al "Advances in RETE Pattern Matching" Science, pp. 226-232 Proceedings of 1986 American Association for Artifial Intellegience 1986.

Primary Examiner—Allen MacDonald
Attorney, Agent, or Firm—R. Bruce Brodie

[57] ABSTRACT

In a pattern-matching network, such as a RETE, elapsed time for successive pattern matching operations is reduced by selectively priming predetermined ones of pattern-matching nodes, such as beta nodes, by caching stabilized computed delta input or argument values derived from ones of the predecessor nodes that appear not to change during the conduct of one of the tests in the node. The computed argument value caching occurs in an argument storing portion of any test to be conducted using a cached argument value. At any node, different tests may or may not be able to used cached argument values.

15 Claims, 2 Drawing Sheets

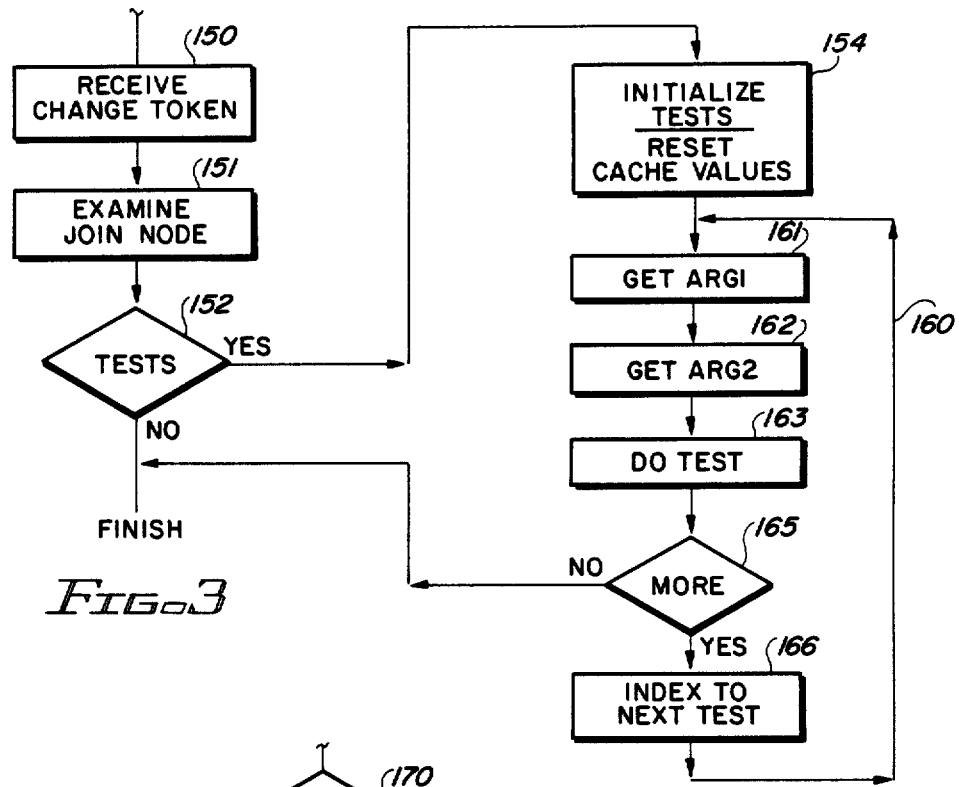
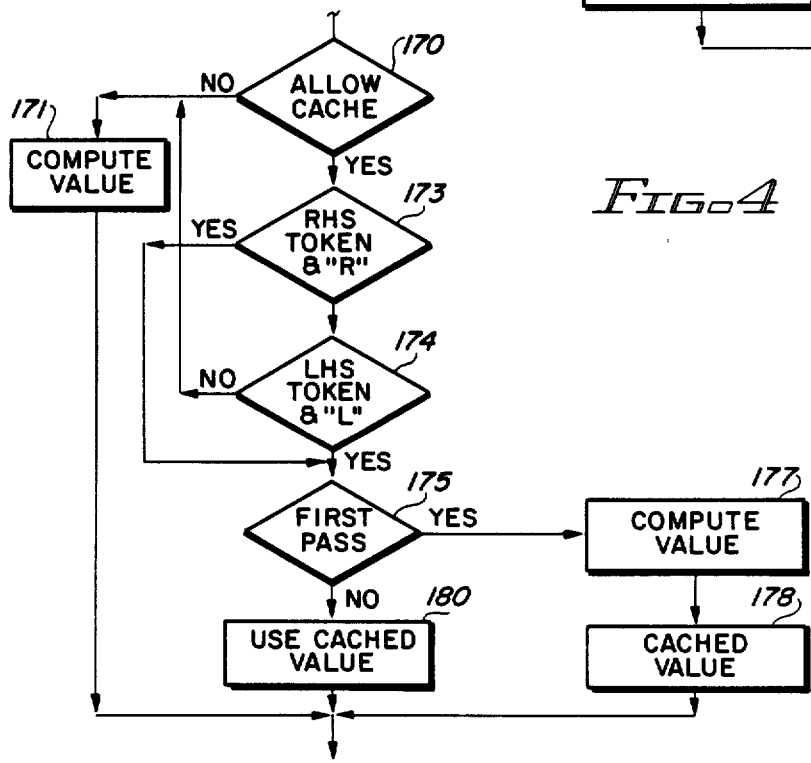

CACHING ARGUMENT VALUES IN PATTERN-MATCHING NETWORKS

FIELD OF THE INVENTION

The present invention relates to pattern-matching networks, including those networks of the RETE type, and more particularly to enhancing performance of such networks.

BACKGROUND OF THE INVENTION

So-called artificial intelligence or pattern-matching programming has been developing and used over the last several years, such as the RETE taught by Forgy. The RETE network is one of several approaches to pattern-matching using set(s) of matching rules. These programs are well known, see the description by Charles L. Forgy in "RETE: A Fast Algorithm for the Many Pattern/Many Object Pattern Match Problem", ARTIFICIAL INTELLIGENCE, Volume 19, 1982, pp 17-37. Another example of the public knowledge in this area is found in an article by Marshall I. Schor et al in "Advances in RETE Pattern Matching", PROCEEDINGS of 1986 AMERICAN ASSOCIATION for ARTIFICIAL INTELLIGENCE CONFERENCE, pp 226-232, 1986. The well known information about RETE networks and artificial intelligence programming is not repeated herein except as needed for one of ordinary skill in this art to understand the present invention.

As is well known, such pattern-matching programming executes with a plurality of data structures. A working memory element (WME) is an input data structure. Any new WME, changed WME or deleted WME results in a "delta" requiring that the RETE be updated. The delta means that the informational content of the RETE does not reflect the WME addition, change or deletion; therefore, the RETE needs to be updated such that it reflects the current informational state of the inputs. In updating the RETE, such "delta" is represented by a change token constructed to precisely represent the delta; that change token is then "pushed" through the RETE for updating the network to reflect the change(s) that have occurred because of the WME change. Each time a change token is pushed (processed) through a RETE and is matched with patterns in a RETE constitutes a pattern match operation. Updating each join node for a delta or change token input may require calculating input arguments for the pattern tests from WME values stored at predecessor memory nodes. This calculation can be time consuming; therefore, it is desired to reduce such calculations without affecting accuracy of the pattern matching operations.

The RETE consists of alpha and beta portions. The alpha portions usually have no memory nodes, i.e. nodes wherein partial pattern matching results are stored; in contrast the beta portion includes such memory nodes and other nodes as well, such as join nodes which may include a plurality of tests involving a multiplicity of argument values. Intermediate the alpha and beta portions are alpha distribution nodes, all of which are memory nodes which store the partial patter matching results generated in the alpha portion. The RETE is updated by so-called change tokens. Each change token has an informational content showing the change in information (the delta) in the RETE system resulting from a new or changed WME or changes resulting from a deleted WME. Such change tokens are pushed through the alpha portion for creating partial match results to be stored in the alpha distribution nodes. Change tokens are then pushed from the alpha distribution nodes into the beta portion.

In the beta portion, each of the join nodes can have two inputs; a left hand sided input (LHS) input and a right hand sided input (RHS). A change token may arrive at either of the two inputs. A join node may include a multiplicity of pattern matching tests. When a token arrives at one input (either LHS or RHS), these tests may require plural test iterations for each change token; i.e. each test may have man test operations when the opposite memory has a large number of partial match tokens. These tests may be thought of as having two parts; a fist part which obtains the arguments for the tests and a second part which performs the test. For many applications, a majority of the time involved in performing a test is in obtaining the arguments; often, the test itself is simple, such as comparing two patterns for identity or equality. Such calculations lower RETE performance. This lowered performance is particularly notable when the nodes have a large number of tests to be performed. It is desired to reduce the execution time of pattern-matching networks of all types, and more particularly reduce time required in the beta portions of the RETE networks.

As known in the art, the outputs of the memory nodes represent an update status of the RETE; the memory node contents include partial match tokens and can be an input to a next successor node as an "opposite memory". The change token is compared with specified partial match tokens in the opposite memory. Such opposite memory is the memory of an immediate predecessor node on the "opposite" side of the node receiving the change token. This matching uses two kinds of information. A first kind of information describes pattern tests including a type of test function to call, specifications of the test arguments and information describing partially matched WME data element tokens. This first kind of information is computed when the RETE structure is built from specified patterns. A second kind of information is computed as WMEs are created, modified or deleted which cause WME change tokens to be pushed through the RETE. It is to be understood that accesses to all information follow usual programming procedures and that the matching operations are usual programming effected comparisons. As one example, a single join or a match node each could utilize 100, 1000 or more values in a single test; such values are scanned for effecting comparisons looking for a match with a change token being pushed through the network. Each such node may have many of such tests.

SUMMARY OF THE INVENTION

The present invention provides enhanced pattern-matching updating. In accordance with the invention, pattern matching join nodes having tests are examined to ascertain whether or not the arguments inputs for the test depend only on a change token from one side (exclusively) of the join node. This examination depends only on the structure of the RETE, and not on any current contents of any partial match nodes. As a consequence, the examination for determining caching advantages is performed once when the RETE is built or substantially revised.

While conducting pattern matching operations at a join node, a single change token derived value can be compared with a plurality of argument values. Such comparisons are performed in a program loop, such as by scanning a plurality of possible partial match tokens from the opposite memory. During this loop, whenever the change token argument supplied value is constant, it is cached in the join node test portion in which the tests are being conducted. This caching avoids all re-computations for such inputs thereby enhancing RETE operation.

In recent RETE pattern matching practice, pattern tests may depend upon multiple WME attribute values combined in arbitrary ways in computed expressions. This contrasts with earlier RETE practices of using only one WME value. A particular test being conducted at a join node may refer to WME values from either the arriving change token, the opposite memory token (one at a time being selected in the join node loop over all partial match tokens in the opposite memory), or both.

Caching argument values in a join node is preferably on a test by test basis. In any series of different tests, argument values may be cached for some of the tests, such caching may be for argument values derived from either the LHS or RHS nodal inputs. The foregoing and other objects, features, and advantages of the invention will be apparent from the following more particular description of preferred embodiments of the invention, as illustrated in the accompanying drawing.

DESCRIPTION OF THE DRAWING

FIGS. 3 and 4 are simplified flow charts showing machine operations usable at an of the join nodes for implementing the present invention in the illustrated network.

DETAILED DESCRIPTION

Figure 1:
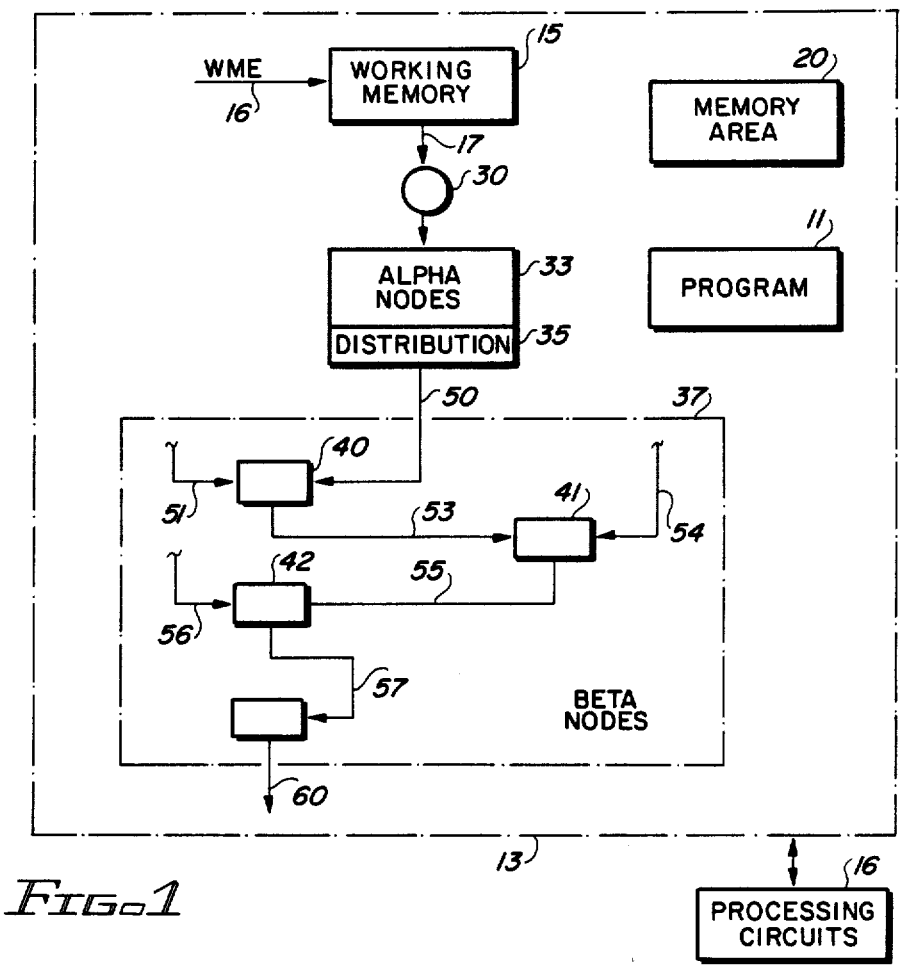
FIG. 1 is a simplified diagram of a RETE network in which the present invention can be advantageously employed.

Referring now more particularly to the appended drawing, like numbers indicate like parts and structural features shown in the figures. The present description is based upon the public knowledge of pattern matching networks as set forth in the referenced documents. A publicly known programming language, such as used in OPS5 and elsewhere, is "Common LISP"; see Guy L. Steele, Jr "COMMON LISP" Digital Press, 1984 (QA76.73.L23573 1984 ISBN 0-9 32376-41-X). A known RETE algorithm is described by Brownstone in PROGRAMMING EXPERT SYSTEMS IN OPS5, Addison-Wesley Publishing Company pp 228-239, 1985.

The invention is practiced in a digital computer 10 having an internal memory represented as dashed line box 13. Computer program 11 is arranged as previous matching network programs, such as RETE programs. Program 11 can be written in common LISP language. These programs operate on data structures (nodes, tokens, rules) to perform the pattern matching operations. A first step in generating or creating a RETE network is to generate a list of rules to define the logic paths of a network, one path per rule. A form of such a rule in shown in Schor et al, supra, on page 226. Then the rules are parsed and arranged, as is well known. Such pattern matching nodes are interconnected to predecessor and successor nodes in a rule defined logic path that extends through the network from the root node 30 to output location 60, one such logic path per rule. This parsing and arranging compiles the pattern-matching network having root node 30, alpha matching nodes 33, alpha distribution nodes 35 and beta nodes 37. The collection of items 30, 33, 35 and 37 are herein termed the RETE. Root node 30 is logically connected to working memory 15. When a working memory element WME is added to, deleted from or changed in working memory 15, as indicated by arrow 16, the informational status of working memory 15 is different from the informational status of RETE resulting in a delta between the RETE and working memory 15. This delta requires a change token, having an informational content representative of the delta, to be pushed through the RETE for updating its data contents to the current state of working memory 15. That change token is stored at a token address. Access to the token and its identification in RETE is made by an address pointer to the token address of memory area 20, another program 11 denominated area of memory 13. It is parenthetically noted that such data and data structures can be paged into and out of memory 13 to peripheral data storage devices, not shown. All other values and operators are similarly identified in network 33-37. The ensuing description assumes that change token pushing has been completed into alpha distribution nodes 35.

Before describing the beta node change token pushing, the beta node array is described. The beta nodes consist of diverse types of nodes, here the interest is in join nodes. Each join node enables pattern matching machine implemented operations to be performed between the two inputs. Each join node includes a table of predicate tests which define the pattern matching testing between the two arguments presented at the two nodal inputs. The program 11 scan of beta portion 37 is, in part, based on the hierarchical nodal connections. The FIG. 1 illustration shows but a few join nodes 40-43, it being understood that many logic paths and many such join or beta nodes are in fact present in a practical construction of a RETE. In the join node, one input (either LHS or RHS) receives the change token (herein termed the delta input pattern to the node) having data to be matched against data stored in the opposite memory (at the opposite nodal input) which is the result memory of the predecessor memory node.

Each join or beta node can have two input ports and one output port. When a token is passed from a predecessor node to a next successor node (as from node 40 to node 41), the token address is usually stored in the output of the passing predecessor node 40 (enables sharing by plural successor nodes). Each output port may store a plurality of such token addresses—representing multiple matching instances. A left-hand sided LHS input port for the join nodes is represented by numerals 51, 53, 56, and 58 respectively for beta nodes 40-43. So called right-had sided RHS inputs of the beta or join nodes are respectively represented by numbers 50, 54, 55 and 57 for nodes 40-43. It is to be understood that alpha distribution nodes 35 have a relatively large number of logical outputs to a large number of level one nodes and with connections directly to lower levels (higher number of level) in the beta node portion of the RETE. Level one nodes may have one or both inputs from the distribution or memory nodes 35. A predecessor node is one that is logically closer to the alpha distribution node 35 than the node of interest, i.e. node 40 is a predecessor node to node 41; node 41 is a successor node to node 40. It is to be appreciated that in a constructed embodiment, that the number of join nodes may be numbered in the hundreds or more.

Figure 2:
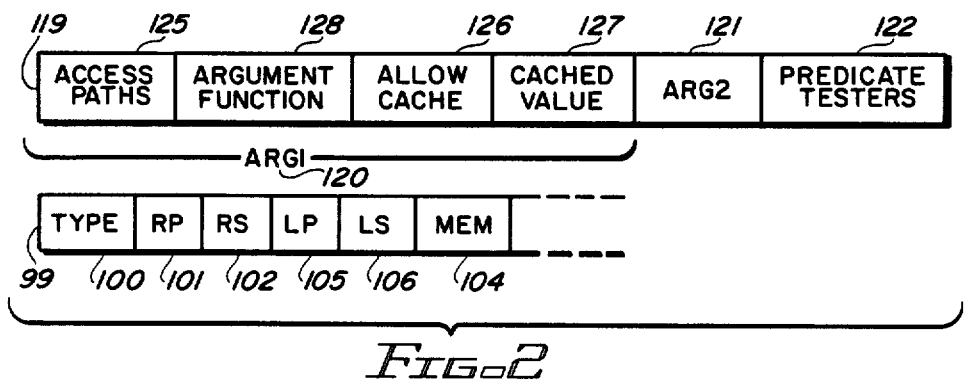
FIG. 2 is a simplified diagram of some data structures usable to implement the present invention into the FIG. 1 illustrated network.

The data structures used in connection with RETE's are known and not repeated here. Shown in FIG. 2 are partial data structures for beta nodes 37 which facilitate an understanding of the present invention. Beta node data structure 99 includes field TYPE 100 which indicates the character or type of join node, as is known. Examples of the type of beta node are the characteristics of the pattern-matching tests to be conducted by program 11 at the node, which in an oversimplification can include AND logic steps, "does-not-exist" logic steps, etc. Field RP 101 stores a memory address pointer to the RHS or right (RP) predecessor node, if any. Field RS 102 similarly stores a memory address pointer(s) to RHS or right successor (RS) nodes. A similar set of address pointer fields LP 105 and LS 106 respectively store the points to the left predecessor and left successor nodes. MEM field 104 stores the partial match tokens constructed from tokens arriving at the nodal inputs, representing those tokens passing the logic or pattern matching tests of the node. Once stability of any given argument for a given test is determined, then caching of the arguments computed or derived value in the join node is enabled, as later described, in the cached value field 127 of the appropriate argument ARG1 or ARG2. Such caching for priming the currently discussed beta node is indicated in the later described predicate test structure 119; in the illustrated embodiment, the argument value caching is only for tests and occurs once for a cacheable argument value on a test by test basis. Accordingly, the caching concept includes partial caching of a stabilized delta input to a node wherein the caching is only for the test argument determined to be stable or effectively a constant for the moment; no changing argument is cached. It is to be understood that structure 99 contains additional control fields not shown nor discussed as is known. Included in a beta node are definitions of tests as represented by test data structure 119; here is where the argument values are cached. Fields ARG1 120 and ARG2 121 contain pointers to first and second test arguments for the join node test being described. Predicate tests field 122 stores an address pointer to "program(s)" stored in memory area 20 which execute the identified predicate tests between the ARG1 and ARG2 computed values. A plurality of test structures 119 may be at one beta node and may be stored as a linked list. The test arguments have no logic relationship to the LHS nor RHS inputs of the join node.

Each argument includes four fields, the fields of ARG1 only are shown; it being understood that ARG2 has an identical field structure. Field 125 contains a definition of the access paths to the data for the argument. When more than one access path is defined, then field "argument function" 128 contains a pointer to a program in memory area 20 which combines the data from each of the access paths into one test argument value; that one value is to be used in the predicate test identified in field 122. Such program pointed to in field 128 can be any expression or programmed function usable for combining values, as defined below. When only one access path is defined; then, usually, the retrieved value is used in the test. These access paths are used in determining candidacy of join nodes for caching nodal delta input patterns (change tokens at the nodal input). The term value includes numeric values, arbitrary symbol strings, data objects (such as arrays, programmed functions or procedures, hashing tables, vector structured arrays, and the like), etc. which can cooperate with a predicate test.

Field 126 indicates whether or not the value of an argument is a candidate for caching, as later explained. The actual cached values are stored in field 127. In the present embodiment, even though both the node inputs are caching candidates, only one of the inputs is cached for a given test to be conducted. It should be noted that the test expression may be used with a large plurality of test values of one of the test arguments; this requires repeated usage of the argument value (derived from the received change token) which is to be cached for such repeated testing against a multitude of argument values stored in the opposite memory.

Each time a change token is "pushed" by program 11 from one of the alpha distribution nodes 35, as over logic line 50, certain beta nodes 37 are updated. Such updating may require conducting tests with arguments obtained from both the change token at a particular join node, and with arguments obtained from partial-match tokens stored in the RETE at the "opposite" predecessor memory node. The opposite memory is the RHS predecessor partial-match token memory. As a change token is pushed from an alpha distribution node 35 to node 40 input, tests are conducted at node 40 (the tests are defined and are a part of node 40) by program 11 between the RHS token input (herein also referred to as the delta input) and the memory at the opposite or LHS nodal input. Note that this memory actually is located in the LHS predecessor node, rather than physically at the LHS nodal input.

In accordance with the invention, the access path characteristics of the arguments of pattern tests that may be present in the join node are analyzed. When it is determined that an argument to a pattern test only depends on the delta change input to the join node, and not upon any WME value from an opposite memory, then the computation of that argument value is cached in the appropriate field 127. Such caching action saves the result of computing the value of an argument to a predicate test and eliminates subsequent re-computation of that value for subsequently executed tests which include iterated or loop comparisons between the change token argument value with partial match tokens of the "opposite" memory. This caching reduces the accessing in predecessor tokens of WME values and enhances the pattern matching speed. The cached value is maintained for the duration of the join loop comparison operations with the opposite memory.

An argument for a pattern test in a join node may involve values from WMEs arriving on the LHS, the RHS, or both nodal inputs. This determination may be done once, when the RETE structure is built from the pattern match specification. Arguments depending on values only from one nodal input side (either RHS or LHS) may be cached when the change token arrives from the same side.

Once a RETE is established or modified, the caching candidacy is determined by analyzing the pattern match tests argument access paths for all nodes having pattern match tests. The caching candidacy is established independently for each argument of a pattern test. There may be zero or more such patterns at any of the join nodes. The argument access paths specify one or more paths through the token tree to reach particular WMEs identified in the token; once a particular WME is selected from the partial match token, the access path includes access to an attribute identified in the selected WME. A partial-match token generally is an n-tuple of WMEs representing a partial pattern match among such WMEs in the n-tuple that satisfy the pattern matching tests up the that point in the RETE.

In a preferred implementation, the n-tuple of WME's is stored as a binary tree having a structure paralleling that of the respective join nodes in the RETE. A particular argument in a pattern matching test often may refer to but one value in one WME; in such an instance, when the WME being referred to is found via a partial match token at the LHS nodal input (either the delta change arrives there or a token from the LHS predecessor node's partial match memory 104), the argument is marked as "L" in field 126. When an argument in a test refers to a multiplicity of WME values, all such values are accessed via the LHS nodal input. This argument is also marked as "L" in field 126. Likewise, if all WME values of an argument are accessed via the RHS nodal input, that argument is marked "R". When the argument includes values from both LHS and RHS accessible WMEs, the argument is marked as "not cacheable". These markings are symbolic; in a practical embodiment, usual encoded representations are used to indicate the symbolic values. Such marking occurs but once when the RETE is built (after the access paths have been analyzed). The contents of fields 126 of both nodal inputs in the respective join nodes are used during pattern matching to selectively implement caching of the values.

Referring next to FIGS. 3 and 4, the machine operations relating to caching values at a join node are described. FIG. 3 shows the overall sequencing while FIG. 4 shows obtaining arguments using cached and non-cached operations. At step 150 a change token is received at either of the nodal inputs, LHS or RHS; the sequence of operations is the same for both inputs excepting that the nodal sides are reversed. At step 151, the join node (as defined above) is examined for any tests (number of tests may vary from none to an arbitrary large number of tests each of which may have a large number of argument values to be tested) to be conducted with respect to the received change token and partial match token(s) in the opposite memory. If no tests were found in step 151, program 11 proceeds to other machine operations beyond the scope of the present description; otherwise the tests to be conducted are initialized in step 154 and the cache value fields (127 for ARG1 and not shown for ARG2) are erased or reset. Remember the opposite memory for an LHS received change token is the memory at the right predecessor node and for an RHS received change token it is the memory at the left predecessor node. Following step 154, a test loop 160 is entered for conducting the tests. In steps 161 and 162 the arguments ARG1 and ARG2 for the tests are obtained and computed, as shown in FIG. 4 for each of the arguments. Then a test is conducted at step 163. At step 165, program 11 determines whether or not more tests are to be conducted. No additional testing occurs whenever the last test conducted failed or all tests were successfully completed. With no more tests to be conducted, the illustrated set of machine operations are exited for machine operations known in the art relating to leaving the join node and proceeding to other operations beyond the scope of this description. When more tests are to be conducted, then the program indexes to the next test at step 166 for another iteration of test loop 160.

The machine operations conducted in steps 161 and 162 are shown in FIG. 4 beginning with step 170 wherein the allow caching value 126 of ARG1 or of ARG2 is examined. This caching value is "L", "R" or "not cacheable"; L indicating that the LHS nodal input (ARG1, for example) is a candidate for caching, R indicating that the RHS nodal input (ARG2, for example) is a candidate for caching and not cacheable indicating that neither argument is a candidate for caching. When not cacheable is sensed with respect to the received change token, then the prior art system of obtaining and computing arguments is employed. The prior art requires that in each iteration of loop 160, program 11 obtains and computes the argument value at step 171 for the current argument. When caching is allowed for the received change token, then program 11 matches the R and L indications with the side the node received the change token. At step 173, the value R is compared with an RHS input change token while at step 174 the value L is compared with an LHS input change token side. If there is a mismatch, then caching is not performed, and again the prior art method of obtaining and computing the argument value in each loop interation is employed. From step 174, program 11 proceeds to step 171 to perform an argument computation for the current argument. Assuming no mismatch, program 11 at step 175 determines whether the argument fetch and calculation is the first pass for the current argument. If yes, the current argument is fetched and computed at step 177, which is identical to the operations of step 171 and in the prior art. Upon completing the computation, the computed value at step 177 is cached in the appropriate ARG1 or ARG2 cached value field for use in ensuing iterations of the test and, of course, is used in the current test. In the ensuing iterations, rather than computing the argument values as in the prior art, the cached value is obtained from the cached value field at step 180 and used in the test. Program 11 at step 175 determines it is not the first pass, therefore program 11 knows the cached value is present and ready for usage.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of updating a pattern-matching network having a plurality of pattern-matching nodes which are logically interconnected in logic paths so that argument inputs to the nodes come from diverse predecessor ones of the nodes; including the machine-executed steps of:
   at a predetermined one of said nodes, passing a change token from a set of predecessor nodes to a first input of said one node for updating same;
   at a predecessor node logically connected to a second input of said predetermined one of said nodes, storing a plurality of pattern match tokens;
   for each test to be conducted, indicating whether or not the change token may result in changing values during test interation in a test to be conducted;

examining the node for tests to be conducted between the change token and partial match tokens available to said second input, if no tests are to be conducted, then proceeding to other machine operations, otherwise;

if the indication shows no changing values during said one test, computing the change token value for a first iteration of the test and caching the computed change token value for said one node and using the cached value for ensuing iterations of said one test, otherwise computing the change token argument value at each iteration of said one test.

2. In a machine-effected method of updating a pattern-matching network, including the machine-executed steps of:

pushing pattern-matching tokens through predetermined pattern-matching nodes for updating the network; and at each of said predetermined nodes, measuring the stability of the respective argument values for use in a given test to be conducted at the predetermined nodes; and upon determining stability of said argument values, caching the respective argument values for the respective nodes for a next ensuing set of iterations of said tests, respectively.

3. In the machine-effected method set forth in claim 2, further including the machine-executed steps of:

conducting a series of tests using differing argument values related to a plurality of change tokens; and caching the respective differing argument values for those tests in which such respective differing argument values are stabilized.

4. In the machine-effected method set forth in claim 3, further including the machine-executed steps of:

selecting a RETE as the pattern-matching network, wherein the RETE has an alpha portion and a beta portion, the alpha portion including alpha nodes and alpha distribution nodes and said beta portion including join nodes which are said predetermined ones of the test nodes;

pushing said token through alpha ones of the RETE nodes up to said alpha distribution nodes and storing in said alpha distribution nodes change tokens to be pushed to said beta portion nodes; and caching the stabilized change token argument values in stabilized inputs in said predetermined ones of beta nodes of the RETE in which the tests are to be conducted using such stabilized values.

5. In the machine-effected method set forth in claim 4, further including the machine-executed steps of:

examining the access paths for arguments from said first and second inputs, if the access paths from said first and second inputs involve inputs to predecessor nodes which are all respectively to said first or second inputs of such predecessor nodes, then marking the arguments having access paths all like inputs to predecessor nodes (either first or second) as being stabilized at least for a given one of the tests; and marking all other arguments in the node as not being stable.

6. In the machine-effected method set forth in claim 5, further including the machine-executed steps of:

selecting the network as a RETE network and designating the first input of each two input node as an LHS input and designating the second input of each to input node as an RHS input.

7. In the machine-effected method set forth in claim 6, further including the machine-executed steps of:

identifying a plurality of access paths for arguments to be used with a one of the tests;

designating one or more of said identified access paths for each of the arguments for said one of the tests;

when a plurality of access paths is designated for any one of the arguments for the one of the tests, providing an argument function control for combining the data from each of said plurality of access paths for said any one test argument into a test value using said argument function control; and then using the test value in said one of the tests.

8. In a machine-effected method of operating a pattern matching network, including the machine-executed steps of:

establishing a plurality of logically interconnected test nodes in the network that have first and second inputs, predicate tests and an output, examining all access paths of all nodes for arguments to be used in tests in the respective nodes for ascertaining the character of the logical connections leading to the nodes, respectively; and comparing the ascertained character of the logical connections with predetermined logic change criteria, for each of said access paths to be used to derive data for arguments, if the comparison shows a first predetermined relationship to said criteria, marking such argument associated with the access paths, respectively, as a caching candidate, otherwise marking the argument for no caching.

9. In the machine-effected method set forth in claim 8, further including the machine-executed steps of:

supplying a delta input to a one of said nodes for a pattern matching operation, caching the delta input derived value in said one node when such argument is marked as a candidate for caching; and conducting tests in the one node using values derived from ones of said delta inputs or the cached delta input value for predetermined ones of the tests at said on node.

10. In the machine-effected method set forth in claim 9, further including the machine-executed steps of:

identifying a plurality of access paths for the test arguments, designating one or more of said identified access paths for each of the test arguments; and when a plurality of access paths is designated for any one of the test arguments, executing a programmed expression on the values identified by the respective plurality of access paths for combining the data from each of said plurality of access paths for said any one test argument into a single test value using said argument function control and then using the test value in the test for which the test argument is intended.

11. In the machine-effected method set forth in claim 9, further including the machine-executed steps of:

when an argument for a test is marked for caching, repeating said comparing and marking steps for each test of any plurality of tests in the test node using a cached value; and caching the delta input value for only the tests for which said repeating and comparing steps effect caching the delta input value.

12. In apparatus for effecting pattern matching operations, including, in combination:

a plurality of test nodes each having first and second inputs and an output and a partial match memory, each of the test nodes being capable of supplying a change token, each change token having related values which can be computed for test purposes;

each of said test nodes having a test node structure with a plurality of predicate tests, each of the tests being responsive to a computed change value related to a first delta input received from a first other one of said test nodes and argument values stored in a partial match memory of a second one of said test nodes and having stored sets of plurality of values to be compared with the first delta input pattern;

first and second argument means in the test node and including means indicating whether or not the respective first and second argument means is a candidate for caching a change value therein;

means is said first other one of the nodes for supplying a change input to a one of said input means for being compared with contents of said partial match memory of said second one of said test nodes as an opposite memory at a second of said input means; and caching means for caching the change input for the duration of predetermined ones of said predicate tests in the first argument means when said first argument means is a candidate for caching.

13. In the apparatus set forth in claim 12, further including, in combination:

means for identifying a plurality of access paths for the test arguments, means for designating one or more of said identified access paths for each of the test arguments; and argument value generating means operative when a plurality of access paths is provided for any one of the test arguments and having an argument function control for combining the data from each of said plurality of access paths for said any one test argument into a single test value for the test to be conducted.

14. In a machine-effected method of operating a pattern matching network having a plurality of join nodes some of which have predicate tests requiring at least two arguments for each of the tests;

including the machine-executed steps of: identifying a plurality of access paths for the test arguments, designating one or more of said identified access paths for each of the test arguments; and when a plurality of access paths is provided for any one of the test arguments, providing an argument function control for combining the data from each of said plurality of access paths for said any one test argument into a test value using said argument function control and then using the test value in the test for which the test argument is intended.

15. In the machine-effected method set forth in claim 14, further including the machine-executed steps of:

determining when any one of said test values from a plurality of access paths will be a constant for a given test having a plurality of test iterations; and caching the test value at the test for all iterations of the given test.

* * * * *